United States Patent [19]

Dixon et al.

[11] 4,344,132
[45] Aug. 10, 1982

[54] SERIAL STORAGE INTERFACE APPARATUS FOR COUPLING A SERIAL STORAGE MECHANISM TO A DATA PROCESSOR INPUT/OUTPUT BUS

[75] Inventors: Jerry D. Dixon, Boca Raton; Robert H. Farrell, Coral Springs; Francis R. Koperda, Delray Beach, all of Fla.

[73] Assignee: International Business Machines Corporation, Armonk, N.Y.

[21] Appl. No.: 103,782

[22] Filed: Dec. 14, 1979

[51] Int. Cl.³ .......................... G06F 3/00; G06F 5/06
[52] U.S. Cl. .................................. 364/200; 307/271; 307/DIG. 1
[58] Field of Search ... 364/200 MS File, 900 MS File; 307/271, DIG. 1

[56] References Cited

U.S. PATENT DOCUMENTS

| | | | |
|---|---|---|---|
| 3,370,276 | 2/1968 | Schell, Jr. | 364/200 |
| 3,569,943 | 3/1971 | Mackie et al. | 364/200 |
| 3,696,338 | 10/1972 | Preiss | 364/200 |
| 3,775,751 | 11/1973 | Anderson | 364/200 |
| 3,840,859 | 10/1974 | Vigil et al. | 364/200 |
| 3,980,993 | 9/1976 | Bredart et al. | 364/200 |
| 4,062,059 | 12/1977 | Suzuki et al. | 364/200 |
| 4,126,895 | 11/1978 | Weemaes et al. | 364/200 |
| 4,143,418 | 3/1979 | Hodge et al. | 364/200 |
| 4,217,637 | 8/1980 | Faulkner et al. | 364/200 |

OTHER PUBLICATIONS

Dias et al., "Accumulative Distribution Decoder" in IBM Tech. Discl. Bull., vol. 18, No. 6, Nov. 1975, pp. 1950-1951.
Hennet et al., "Response Time Distribution Feature", in IBM Tech. Disc. Bull., vol. 19, No. 9, Feb. 1977, pp. 3524-3525.
Peatman, *Microcomputer-Based Design*, McGraw Hill Book Co., pp. 214-219.

*Primary Examiner*—Gareth D. Shaw
*Assistant Examiner*—Eddie P. Chan
*Attorney, Agent, or Firm*—Richard E. Bee

[57] ABSTRACT

Serial storage interface apparatus for coupling a serial storage mechanism, such as a charge coupled storage device or a magnetic bubble storage device, to a data processor input/output (I/O) bus. Speed control circuitry is provided for causing the serial storage mechanism to operate at a higher speed when the data processor is responding more rapidly to data transfer requests from the interface apparatus and at a lower speed when the data processor is responding less rapidly to data transfer requests from the interface apparatus. This speed adjustment feature reduces the amount of data buffering required for interfacing a serial storage mechanism to an asynchronous variable response time I/O bus system.

16 Claims, 8 Drawing Figures

READ OPERATION

SERIAL STORAGE INTERFACE APPARATUS FOR COUPLING A SERIAL STORAGE MECHANISM TO A DATA PROCESSOR INPUT/OUTPUT BUS

DESCRIPTION

Technical Field

This invention relates to serial storage interface apparatus for coupling a serial storage mechanism to a data processor input/output (I/O) bus.

A serial storage mechanism or device is one wherein the data storage locations cannot be accessed in a random manner but must instead be accessed in a sequential manner, one storage location after the other, until the desired storage location is reached. Examples of serial storage mechanisms are magnetic disk units, magnetic tape units, magnetic bubble storage devices and charge coupled device (CCD) storage devices. A major problem encountered when a storage mechanism of this character is coupled to a data processor I/O bus is that of preventing the storage mechanism from overrunning the data transfer rate of the I/O bus. In the typical system, the data processor will have multiple peripheral devices coupled to its I/O bus and different numbers of these devices may be contending for the use of the I/O bus at different times. Thus, during some intervals of time, the serial storage mechanism may have very nearly the exclusive use of the I/O bus while, during other intervals of time, the serial storage mechanism may be required to share the use of the I/O bus with one or more other peripheral devices. Thus, the effective I/O bus data transfer rate as far as the serial storage mechanism is concerned will typically vary from time to time, depending upon the activity of the other peripheral devices. During those intervals when the effective I/O bus data transfer rate for the serial storage mechanism is relatively low, the serial storage mechanism may be attempting to input or output data at a greater rate than it can be handled by the I/O bus. This is the undesired overrun condition wherein data may be lost or erroneous data may be stored by the storage mechanism.

The usual solution of the overrun problem is to provide a data buffer between the serial storage mechanism and the I/O bus, with such data buffer having enough storage capacity to temporarily store enough data to compensate for a relatively large difference in the data transfer rates of the I/O bus and the serial storage mechanism. Thus, such data buffers are usually of relatively large size or capacity, or at least larger than is desired.

Sometimes it is advantageous that such data buffers take the form of so-called First-In-First-Out (FIFO) storage mechanisms. The input and output timings of such FIFO mechanisms are substantially independent of one another and either or both of the input and output can readily operate in an asynchronous manner. Thus, these FIFO mechanisms have the ability to accept data at one data rate and emit it at another data rate without encountering any significant timing complications or other major problems. Nevertheless, the FIFO storage mechanism must also be of sufficient size or capacity to temporarily store enough data to take into account the largest difference in I/O bus and serial storage mechanism data rates that is likely to be encountered under normal operating conditions. Also, for the case of array type FIFO's, the larger the FIFO, the longer the time required for the data to ripple through from the input side to the output side of the FIFO. If the FIFO gets too large, this ripple through time can degrade the overall performance of the system.

SUMMARY OF INVENTION

In accordance with the present invention, it has been discovered that the data storage capacity requirements of a data buffer used for coupling a serial storage mechanism to a data processor I/O bus can be considerably reduced if the operating speed of the serial storage mechanism is dynamically adjusted or varied to take into account the effective I/O bus data transfer rate being made available to the serial storage interface. In accordance with this discovery, the present invention provides serial storage interface apparatus having data transfer circuitry for coupling the serial storage mechanism to the data processor I/O bus and further having speed control circuitry responsive to the data transfer activity of the data transfer circuitry for causing the serial storage mechanism to operate at different speeds for different values of I/O bus availability to the serial storage interface apparatus.

In the ideal or ultimate case, the operating speed of the serial storage mechanism is varied so as to keep the data rate of the serial storage mechanism exactly equal to the effective data transfer rate provided to the serial storage mechanism by the I/O bus. Theoretically, this would eliminate the need for any data buffering between the serial storage mechanism and the I/O bus. For various practical reasons, however, it will still be generally desirable to provide some small amount of data buffering between the serial storage mechanism and the I/O bus. The amount of such buffering will, however, be substantially less than that required when the serial storage mechanism is operated at a constant speed.

As a further point, it is, in fact, not necessary that the operating speed of the serial storage mechanism be variable in a continuous manner over the entire range of variation of the effective I/O bus speed in order to enjoy the benefits of the present invention. In fact, a substantial reduction in the size of the data buffer can be obtained when as few as two different operating speeds are provided for the serial storage mechanism. In other words, a data buffer of significantly smaller storage capacity can be used for the case where the serial storage mechanism is operated at a high speed for an upper range of effective I/O bus data transfer rates and at a low speed for a lower range of effective I/O bus data transfer rates.

Another point to note is that the present invention cannot be used with all existing present-day types of serial storage mechanisms. For example, it is not practical or desirable to vary the operating speeds of present day magnetic disk units and magnetic tape units when they are in the process of reading or writing data. This limitation, however, does not apply to some of the newer types of serial storage mechanisms such as magnetic bubble storage mechanisms and charge coupled device (CCD) storage mechanisms. These latter types of devices can be operated at different speeds without any adverse effect on the placement or the accuracy of the data being stored or read out. An exception to this is that CCD storage mechanisms have a minimum operating speed which is required in order to keep the stored data refreshed in the proper manner. Such CCD mechanisms, however, can be operated at different speeds above this minimum level without causing any impairment of the data. In general, the present invention can be used with any serial storage mechanism or device that can have its operating speed changed without adversely affecting the recording of the data or the playback or readout of the data.

BACKGROUND ART

U.S. Pat. No. 3,997,882 granted to D. K. Goyal on Dec. 14, 1976, describes a charge coupled device (CCD) storage system having a fast clock which is used when performing read and write operations and a slow clock which is used for regenerating or refreshing the data in non-accessed storage cells. No mention is made of data buffering and no mention is made of using different operating speeds for different values of the I/O bus data transfer rate.

U.S. Pat. No. 4,084,154 granted to G. Panigrahi on Apr. 11, 1978, describes a charge coupled device (CCD) memory system wherein different sections of the CCD array are successively refreshed by bursts of clock pulses whereby at any given moment only a small number of the CCD registers are being refreshed. No significant mention is made of data buffering between the CCD system and an I/O bus and no mention is made of varying the CCD operating speed as a function of the effective I/O bus data transfer rate.

Section 5-3 (pages 214-219) entitled "Data Buffering With FIFO's" of a textbook by John B. Peatman entitled "Microcomputer-Based Design", copyright 1977, by McGraw Hill Book Co., describes in a general manner the use of First-In-First-Out (FIFO) storage devices for data buffering purposes. No specific mention is made of using a FIFO with a serial storage mechanism or of varying the operating speed of a serial storage mechanism.

U.S. Pat. No. 4,062,059 granted to S. Suzuki et al on Dec. 6, 1977, describes a more or less typical use of a FIFO mechanism in a data processor I/O system. No mention is made of serial storage type I/O devices or of variable speed I/O devices.

For a better understanding of the present invention, together with other and further advantages and features thereof, reference is made to the following description taken in connection with the accompanying drawings, the scope of the invention being pointed out in the appended claims.

BRIEF DESCRIPTION OF DRAWINGS

Referring to the drawings.

DESCRIPTION OF THE PREFERRED EMBODIMENTS

Figure 1:
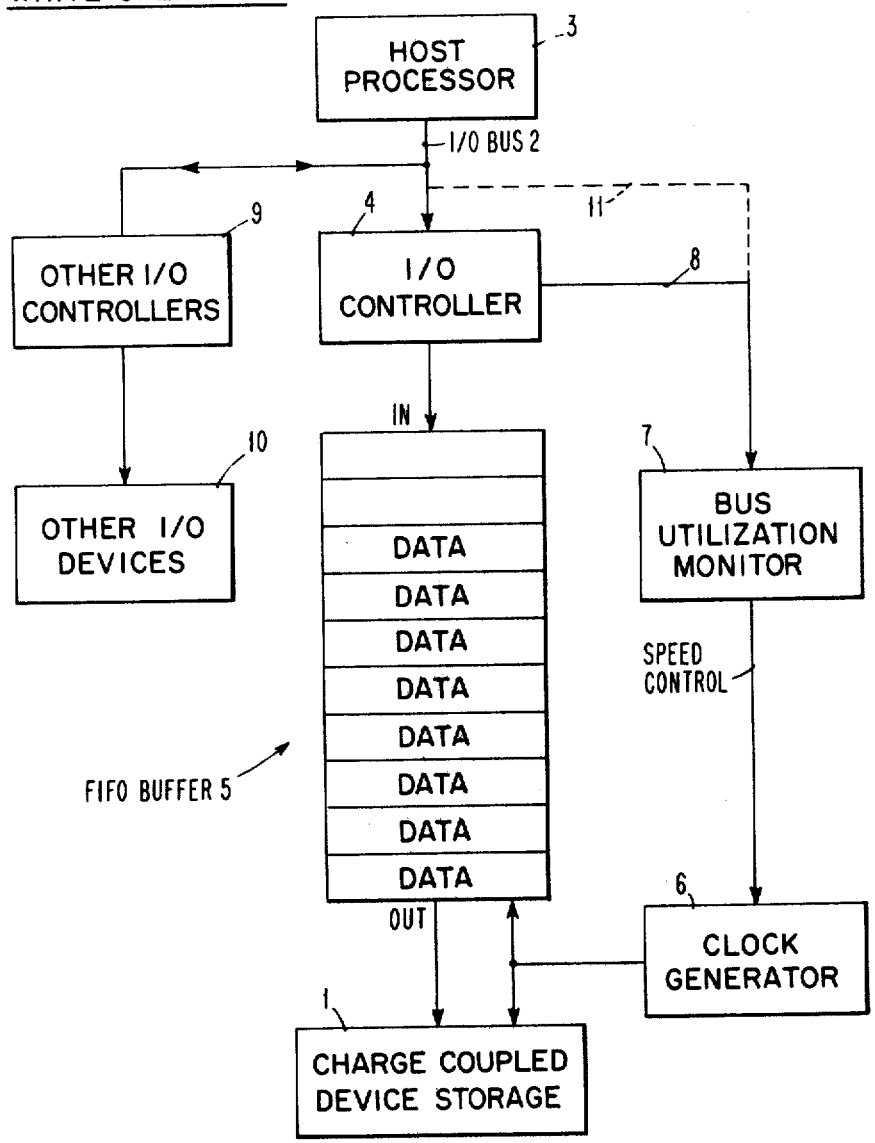
FIG. 1 is a simplified functional block diagram of a first embodiment of the invention for the case where a write operation is being performed.

FIG. 1 shows a digital data processing system which includes a first embodiment of the invention. FIG. 1 shows the case where the system is performing a write operation. As used herein, the term "write operation" or "write mode" refers to the case where data is being transferred from a data processor and written into or stored into a peripheral storage unit. The system of FIG. 1 includes serial storage interface apparatus for coupling a serial storage mechanism 1 to an input/output (I/O) bus 2 of a data processor or host processor 3. The serial storage mechanism 1 may be, for example, a charge coupled device (CCD) storage mechanism.

The interface apparatus includes data transfer circuitry for coupling the serial storage mechanism 1 to the data processor I/O bus 2. This data transfer circuitry includes an I/O controller 4 and a First-In-First-Out (FIFO) buffer storage mechanism 5. The I/O controller 4 includes the circuitry needed for responding to host processor commands addressed to it and the circuitry needed for performing the handshake signalling sequences which are required for transferring each unit of data from the host processor 3 to the I/O controller 4 (or vice versa for a "read" operation). The I/O controller 4 also includes the handshaking circuitry needed for moving the individual data units from the controller 4 to the FIFO buffer 5 (or vice versa for a read operation).

For sake of example in this description, the FIFO buffer 5 is assumed to be of the array type, as opposed to the pointer type. As such, the FIFO buffer 5 is assumed to include multiple registers coupled in cascade, with each register being capable of storing a unit of data. For sake of example herein, the unit of data is assumed to be a 9-bit byte (8 data bits plus 1 parity bit). The FIFO buffer 5 is further assumed to include circuitry for automatically moving data bytes successively stored into the input one of the FIFO registers from one register to the next so as to keep the data bytes stacked in and as close to the output one of the FIFO registers as is possible. This circuitry also advances the data bytes one register position toward the output register each time a data byte is removed from such output register.

In terms of the FIG. 1 representation, the FIFO buffer 5 can be thought of as an array of byte wide registers stacked one above the other with circuitry included for automatically causing a data byte stored into the uppermost or input register to automatically drop down to the lowest available empty or unoccupied register. When a data byte is removed from the lowermost or output register, then the remaining data bytes in the FIFO buffer move down a notch.

As will be seen, the entering of data into the input FIFO register is independent of the removing of data from the output FIFO register, provided, of course, that the buffer is not completely full, in which case no more data can be entered. In other words, if the input conditions are right, then a byte of data is entered into the input register and if the output conditions are right, then a byte of data is removed from the output register and these two operations are performed independently of one another. Thus, the FIFO buffer 5 can accept data at one data rate and emit it at another data rate.

In the FIG. 1 embodiment, the serial storage interface apparatus also includes timing circuitry for supplying timing signals to the serial storage mechanism 1 for controlling the operating speed thereof. This timing circuitry is represented by the clock generator 6. These timing signals are used to advance the stored data from one bit position to the next within the internal structure of the CCD device. Some of these timing signals are also supplied to the output stage of the FIFO buffer 5 to time the movement of the data bytes from the output FIFO register to the CCD storage mechanism 1.

As is known, CCD storage mechanisms are dynamic storage mechanisms and thus the stored data must be refreshed periodically to remain valid. This is normally accomplished by fabricating refresh amplifier stages directly on the substrate of the CCD mechanism in series in the data loops and then continuously circulating the data by operating the CCD mechanism at a speed which is not less than the speed needed to meet the maximum allowable time limit between successive refreshes of any given data bit. Thus, a CCD storage mechanism has a minimum operating speed which must be provided in order for the stored data to remain valid. This minimum speed limitation is not applicable to the case of magnetic bubble storage mechanisms. The minimum allowable speed for a magnetic bubble mechanism is zero. Thus, in those applications where the minimum speed limitation would present a problem, the serial storage mechanism may take the form of a magnetic bubble mechanism.

The serial storage interface apparatus of FIG. 1 further includes speed control circuitry responsive to the data transfer activity of the data transfer circuitry for causing the serial storage mechanism 1 to operate at different speeds for different values of I/O bus availability to the serial storage interface apparatus. In the FIG. 1 embodiment, this speed control circuitry is represented by the bus utilization monitor 7. This bus utilization monitor 7 is coupled by way of monitoring lines 8 to the I/O controller 4 to monitor and to obtain an indication of the data transfer activity between the I/O controller 4 and the host processor 3. In response to such data transfer activity indication, the bus utilization monitor 7 develops a speed control signal which is supplied to the clock generator 6 to vary the operating speed or operating frequency of such clock generator in accordance with variations in the percentage of time the I/O bus 2 is made available to the I/O controller 4. In particular, the bus utilization monitor 7 causes the clock generator 6 to operate at a higher speed or frequency when the I/O bus 2 is made available to the I/O controller 4 a greater percentage of the time and causes the clock generator 6 to operate at a lower speed or frequency when the I/O bus 2 is made available to the I/O controller 4 a lesser percentage of the time. Thus, the bus utilization monitor 7 is used to provide an indication of the effective data transfer rate which is being provided by the I/O bus 2 to the I/O controller 4.

In the FIG. 1 embodiment, the bus utilization monitor 7 and the clock generator 6 are preferably constructed so that, over the normal operating range of the system, the operating speed of the CCD storage mechanism 1 is varied so as to keep the rate of data storage into the CCD mechanism 1 as nearly equal to the effective I/O bus data transfer rate as is possible, with the exception that the operating speed of the CCD mechanism 1 is never allowed to fall below the minimum permissible value for refresh purposes. In this regard, the parameters are such that the maximum I/O bus data transfer rate is greater than the minimum CCD refresh rate by an amount which is sufficient to provide a reasonable operating range. The clock generator 6 may include as its master timing element a voltage-controlled oscillator, with the speed control signal being supplied to the voltage control terminal of such oscillator to vary its frequency in accordance with the magnitude of such speed control signal. The data storage capacity (number of register stages) of the FIFO buffer 5 is selected to provide a small amount of buffering to take care of imperfections in the ability of the CCD data storage rate to exactly track the effective I/O bus data transfer rate.

As is indicated in FIG. 1, various other I/O controllers 9 and various other I/O devices 10 are typically connected to the host processor I/O bus 2. These other I/O devices 10 are also contending for the attention of the host processor 3 and the use of the I/O bus 2. This is the reason that the effective I/O bus data transfer rate seen by the I/O controller 4 will vary from time to time. During periods when the other I/O devices 10 are more active, less I/O bus time will be allocated to the I/O controller 4 and hence the effective I/O bus data transfer rate is reduced as far as the I/O controller 4 is concerned.

One way of implementing the bus utilization monitor 7 is to connect it into the host processor handshaking circuitry located in the I/O controller 4 and constructing the circuitry of the bus utilization monitor 7 to provide an indication of the time it takes for the host processor 3 to send back a reply to each service request sent to it by the I/O controller 4. In such case, the bus utilization monitor 7 may include an interval timer type of circuit which is turned on at the moment the I/O controller 4 sends out a service request and is turned off at the moment the I/O controller 4 receives the acknowledgment signal from the host processor 3 for such service request. The speed control signal supplied to the clock generator 6 would then be made inversely proportional to this response time value. This construction causes the clock generator 6 and hence the CCD storage mechanism 1 to operate at higher speeds when the data processor 3 is responding more rapidly and at lower speeds when the data processor 3 is responding less rapidly to the data transfer requests of the I/O controller 4.

As indicated by the dashed line 11, the bus utilization monitor 7 may alternatively be connected to the I/O bus 2, instead of to the internal circuits in the I/O controller 4. In such case, it would monitor the signals on the I/O bus 2 to determine the percentage of time the I/O bus 2 is being made available to the I/O controller 4, as opposed to the other I/O controllers 9. This can again be accomplished by measuring the time it takes for the host processor 3 to respond to the service requests from the I/O controller 4.

Figure 2:
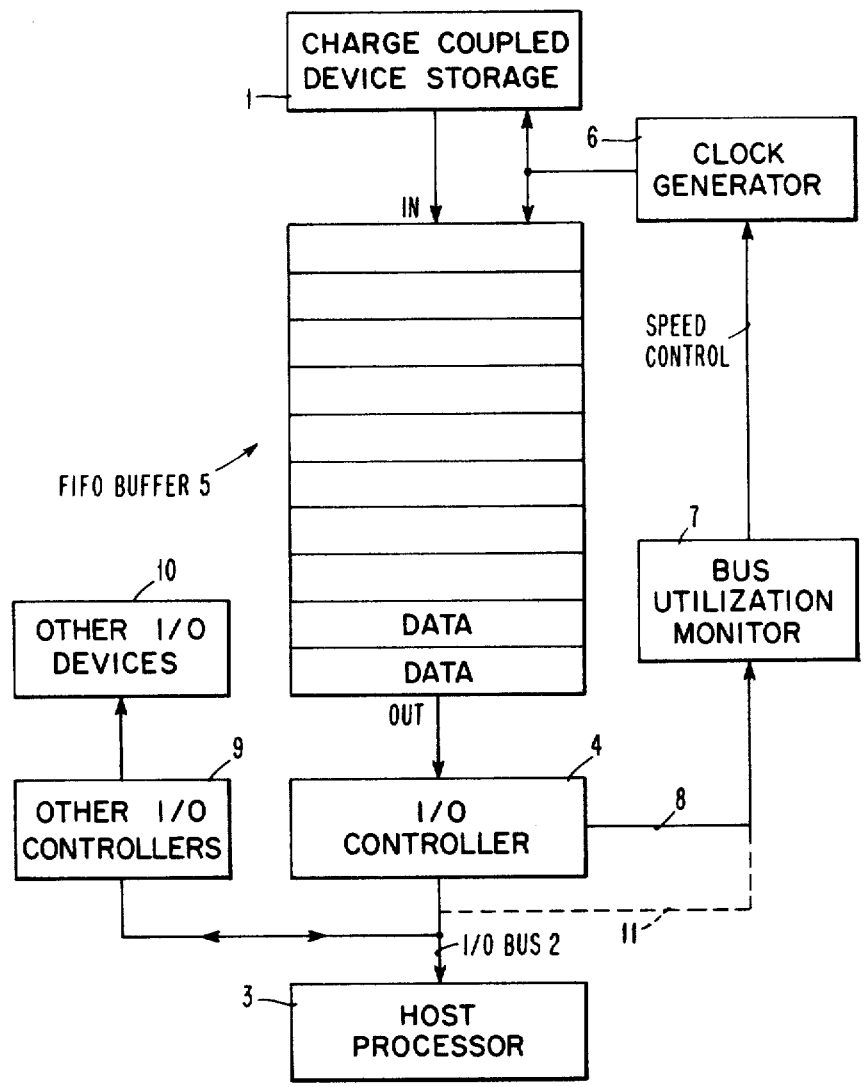
FIG. 2 shows the same embodiment as in FIG. 1 but for the case where a read operation is being performed.

Referring now to FIG. 2 of the drawings, there is shown the counterpart case wherein the elements of FIG. 1 are rearranged to perform read operations. The term "read operation" or "read mode" refers to the case where data is being read out of the serial storage mechanism 1 and transferred via the FIFO buffer 5 and the I/O controller 4 to the host processor 3. The elements of FIG. 2 are the same as those of FIG. 1 with the principal difference being that the data bus connections of the CCD storage mechanism 1 and the I/O controller 4 are interchanged so that the CCD storage mechanism 1 is coupled to the input stage of the FIFO buffer 5 and the I/O controller 4 is coupled to the output stage or output register of the FIFO buffer 5. Apart from that, the same considerations as discussed for the FIG. 1 embodiment also apply to the FIG. 2 embodiment.

Figure 3:
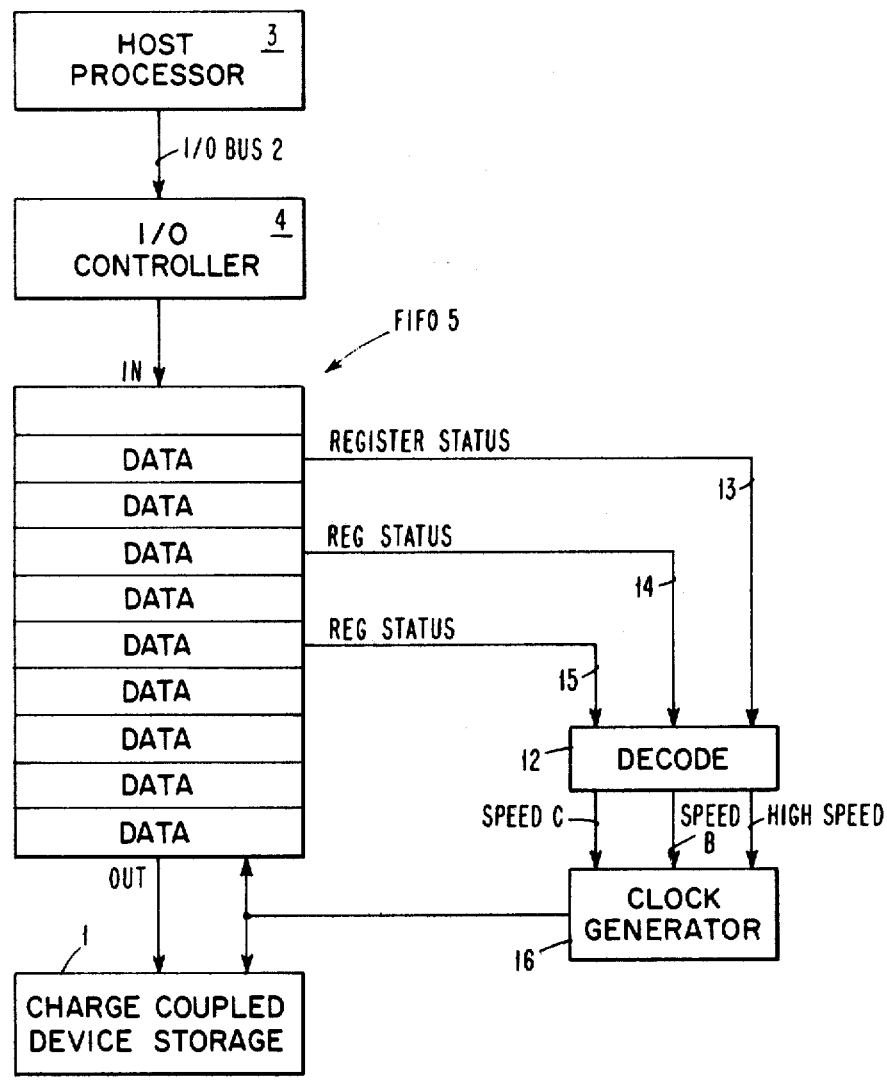
FIG. 3 is a simplified functional block diagram of a second embodiment of the invention for the case where a write operation is being performed.

Referring to FIG. 3, there is shown a further embodiment of the invention for the case where such embodiment is arranged to perform write operations. This FIG. 3 embodiment illustrates how use can be made of the FIFO buffer 5 to obtain therefrom indications of the effective I/O bus data transfer rate being presented to the I/O controller 4. In particular, use is made of the FIFO register status lines to provide a measure of the amount of data in the FIFO buffer storage mechanism 5. The higher the effective I/O bus data transfer rate is relative to the CCD storage mechanism operating speed, the greater the amount of data that will be present in the FIFO buffer 5. Conversely, the lower the effective data transfer rate of the I/O bus 2 relative to the operating speed of the CCD storage mechanism 1, the lesser will be the amount of data in the FIFO buffer 5. Thus, the amount of data in the FIFO buffer 5 can be used as a measure of the effective data transfer rate of the I/O bus 2. Thus, in the FIG. 3 embodiment, the speed control circuitry is coupled to the FIFO buffer storage mechanism 5 in order to develop the speed control signals for the CCD clock generator.

In the FIG. 3 embodiment, the speed control circuitry includes a decoder circuit 12 which is coupled to FIFO register status lines 13, 14 and 15 for developing three different speed control signals for a modified form of CCD clock generator 16. Register status lines 13, 14 and 15 are individually connected to different registers in the FIFO buffer 5 and each such status line provides signals indicative of the full/empty status of the FIFO register to which it is connected. For sake of example, it is assumed that each register status line provides a binary one level signal when its register is full and a binary zero level signal when its register is empty. By "full" is meant that a valid byte of data is sitting in the register, as opposed to merely rippling through on its way to a lower empty register. Conversely, the "empty" status means that there is no valid byte of data sitting in the register.

The decoder 12 decodes the three binary signals on status lines 13, 14 and 15 to activate one and only one of its three output lines. If the binary code on lines 13, 14 and 15 is "111", then the high speed output line of decoder 12 is activated. If the binary code is "011", then the speed B output line is activated. If the binary code is "001", then the speed C output line is activated. If the binary code on the status lines should be "000", then none of the decoder output lines is activated, in which case the clock generator 16 operates at a fourth and still lower operating speed. In this regard, speed B is less than the high speed and speed C is less than speed B.

The modified clock generator 16 is modified in the sense that it is constructed to operate at one of four different operating frequencies, depending on which, if any, of the three different speed control input lines is activated. This can be accomplished by including in the clock generator 16 a master oscillator and three different frequency divider circuits. Also included in the clock generator 16 would be the appropriate switching circuitry or gating circuitry which is responsive to the signals on the speed control input lines for connecting the output of the appropriate one of the oscillator and frequency dividers to the clock generator circuitry which develops the timing signals for the CCD storage mechanism 1 and the output stage of the FIFO buffer 5.

The strategy employed in the FIG. 3 embodiment write operations is to try and keep the FIFO buffer 5 nearly full of data. Assuming the FIFO buffer 5 to be nearly full, which is the case illustrated in FIG. 3, then all three register status lines 13, 14 and 15 are at the full indicating binary one level. In such case, decoder 12 activates its high speed output line and the clock generator 16 and CCD storage mechanism 1 are operated at the fastest or highest operating speed provided by the clock generator 16. For the particular implementation being considered, this maximum operating speed is selected to match the maximum possible I/O bus data transfer rate. This maximum rate must, of course, be greater than the CCD minimum refresh rate.

Assuming that the effective I/O bus data transfer rate for the I/O controller 4 decreases, then the CCD storage mechanism 1 commences to draw data out of the FIFO buffer 5 faster than the I/O controller 4 can add new data to the FIFO buffer 5. Thus, the data level in the FIFO buffer 5 decreases or drops. As soon as the FIFO data register connected to the status line 13 becomes empty, the signal on the status line 13 goes to a binary zero level. This causes the decoder 12 to deactivate the high speed output line and to now activate the speed B output line. This lowers the frequency of the clock generator 16 and hence the operating speed of the CCD storage mechanism 1 to the next lower value.

If the effective I/O bus data rate should return to its maximum value fairly quickly, then the FIFO buffer 5 will start to fill up again until the FIFO register for the status line 13 again indicates a full condition. This causes the clock generator 16 to be switched back to the highest speed so as to maintain the FIFO buffer 5 in a nearly full condition.

Assuming that the effective I/O bus data transfer rate has dropped to a relatively low value, then before very long the FIFO register for the status line 14 becomes empty. This causes the decoder 12 to switch the clock generator to speed C, which is a lower speed than speed B. If the amount of data in the FIFO buffer 5 continues to drop, then at some point the FIFO register for status line 15 will become empty. At this point the clock generator 16 is switched to speed D, which is less than speed C and is the lowest operating speed for the clock generator 16. In a typical design, this lowest or minimum operating speed is selected to correspond to the minimum allowable refresh recirculation rate for the CCD storage mechanism 1.

As seen from the foregoing, the operating speed of the CCD storage mechanism 1 is reduced step by step in an effort to prevent the FIFO buffer 5 from running out of data and, hence, not having any data to supply to the CCD mechanism 1 when it calls for it. This prevents the occurrence of gaps having no valid data in the sequence of CCD storage locations.

Since the CCD storage mechanism 1 does have a minimum operating speed necessitated by the need to continually refresh the data in the CCD, it is at least theoretically possible that the effective I/O bus data rate could fall below this value for a sufficient length of time such that the FIFO buffer 5 would run out of data and cause non-valid indications to be written into some CCD storage locations. In such case, it would be necessary to perform an error recovery routine in order to correct the situation. Preferably, of course, the overall system is designed such that this will not occur very often.

In regard to the minimum refresh speed limitation of a CCD storage mechanism, this limitation is not present when a magnetic bubble storage mechanism is used for the serial storage mechanism. Magnetic bubble mechanisms can have their operating speed adjusted all the way down to zero without any adverse effects. In other words, the data in a magnetic bubble storage mechanism can be allowed to stand still without causing any harm. Thus, in those systems where the effective I/O bus data transfer rate can drop to a very low value on a goodly number of occasions, a magnetic bubble storage mechanism should be used in place of the charge coupled device storage mechanism 1.

Figure 4:
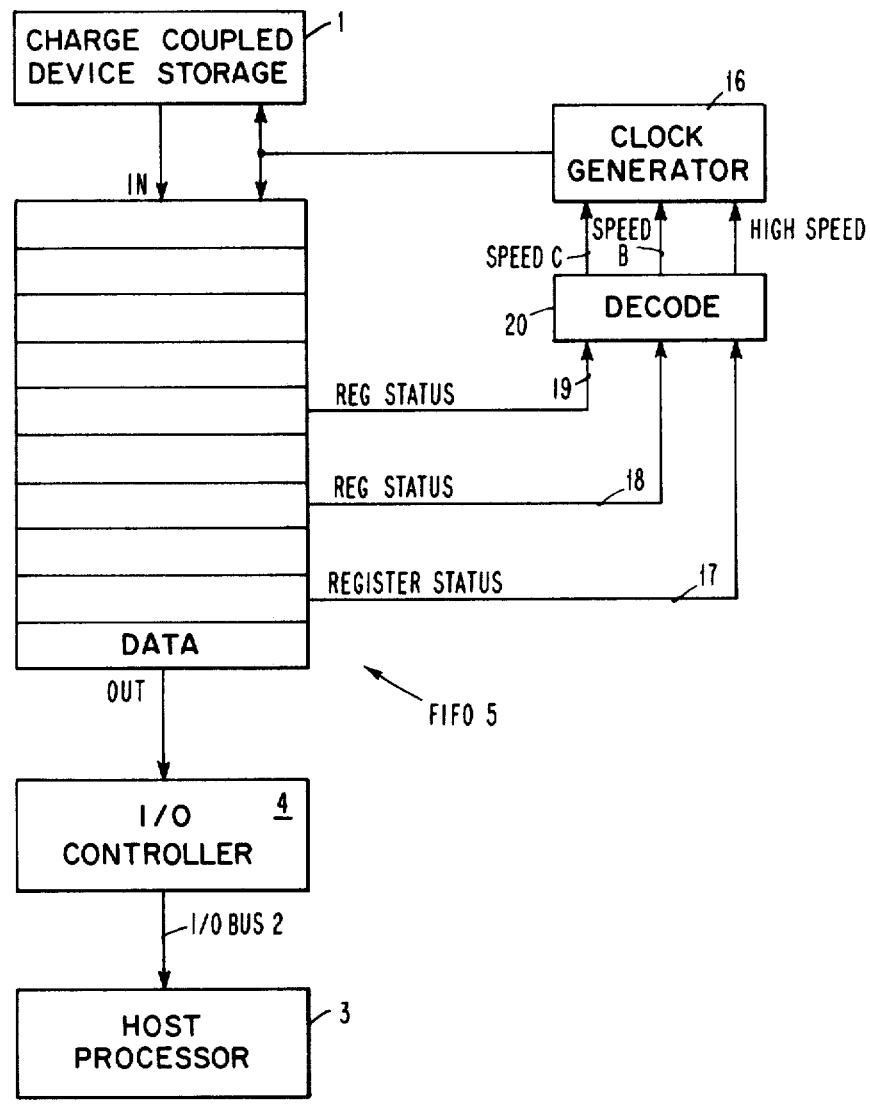
FIG. 4 shows the counterpart configuration for the FIG. 3 embodiment for the case where a read operation is being performed.

Referring now to FIG. 4, there is shown the counterpart to the FIG. 3 embodiment which is used for the case where a read operation is being performed. For the case of read operations, it is necessary to use a different set of register status lines 17, 18, 19 and a decoder 20 having a different internal construction. This is because the strategy in the case of a read operation is to keep the FIFO buffer 5 in a nearly empty condition. The ideal condition is represented by the case illustrated in FIG. 4 wherein the FIFO registers connected to the status lines 17, 18 and 19 are empty.

The decoder 20 is constructed so that when the binary code presented by status lines 17, 18 and 19 is "000", then its high speed output line is activated to operate the clock generator 16 at its highest operating speed. When the binary code on status lines 17, 18 and 19 is "100", then decoder 20 activates its speed B output line to operate the clock generator 16 at the next lower speed. When the binary code is "110", then decoder 20 activates the speed C output line, with speed C being lower than speed B. When the binary code is "111", then none of the decoder 20 output lines is activated and the clock generator 16 is caused to operate at its lowest operating speed, which preferably corresponds to the minimum refresh speed for the CCD storage mechanism 1. Thus, when the effective I/O bus data transfer rate drops, the operating speed of the CCD storage device 1 is reduced step by step in an effort to prevent the data coming out of the CCD mechanism 1 from overflowing the top of the FIFO buffer 5.

Figure 5:
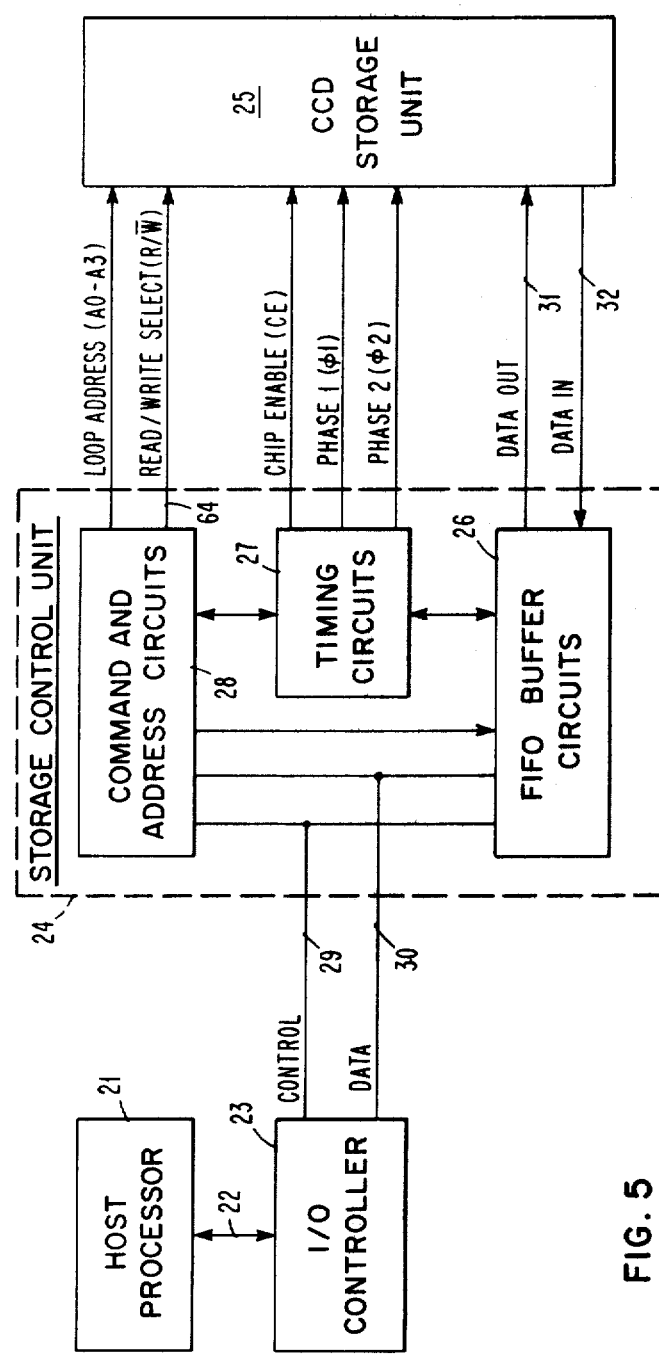
FIG. 5 is an overall block diagram of a typical data processing system in which the present invention may be incorporated.

Referring to FIG. 5, there is shown an overall block diagram of a typical data processing system in which the present invention may be used to advantage. The system of FIG. 5 includes a host processor 21 having a data processor I/O bus 22. An I/O controller 23 is coupled to the I/O bus 22. The other side of the I/O controller 23 is coupled by way of a storage control unit 24 to a charge coupled device (CCD) storage unit 25. The storage control unit 24 includes First-In-First-Out (FIFO) buffer circuits 26, timing circuits 27 and command and address circuits 28. The FIFO circuits 26 and the command and address circuits 28 are coupled to the I/O controller 23 by means of a control bus 29 and a data bus 30.

The system shown in FIG. 5 is depicted in such a general manner that it would apply to both systems which use the present invention and systems which do not use the present invention. Subsequent figures will explain how the circuits 26, 27 and 28 in the storage control unit 24 are constructed in order to practice the present invention in the system of FIG. 5.

For sake of a specific example, it is assumed that the host processor 21 is an IBM Series/1 processor of the type currently manufactured and marketed by the International Business Machines Corporation of Armonk, N.Y. Also, for sake of example, it is assumed that the I/O controller 23 is of the type described in copending United States patent application Ser. No. 919,107, filed June 26, 1978, now U.S. Pat. No. 4,246,637, granted Jan. 20, 1981, entitled "Data Processor Input/Output Controller" and assigned to the International Business Machines Corporation of Armonk, N.Y. It is further assumed, purely for sake of specific example herein, that the CCD storage unit 25 is comprised of type TMS 3064 CCD memory modules of the kind currently manufactured and marketed by Texas Instruments, Inc., of Dallas, Tex. As is known, the TMS 3064 is a high speed dynamic 65,536-bit CCD block-addressable serial memory. It is organized as 65,536 one-bit words in 16 addressable blocks or loops of 4096 bits each. As such, each TMS 3064 module is capable of inputting or outputting one bit at a time. It is assumed herein that the CCD storage unit 25 is comprised of nine such TMS 3064 modules which are operated in unison in a parallel manner so as to provide a simultaneous 9-bit input or output of data. Thus, each of the CCD unit input and output buses 31 and 32 of FIG. 5 is assumed to be comprised of nine different bit lines for enabling a complete byte of data to be written into or read out of the CCD storage unit 25 at any given instant. In this regard, the I/O controller data bus 30 is also assumed to be a 9-bit or byte wide data bus.

Figure 6:
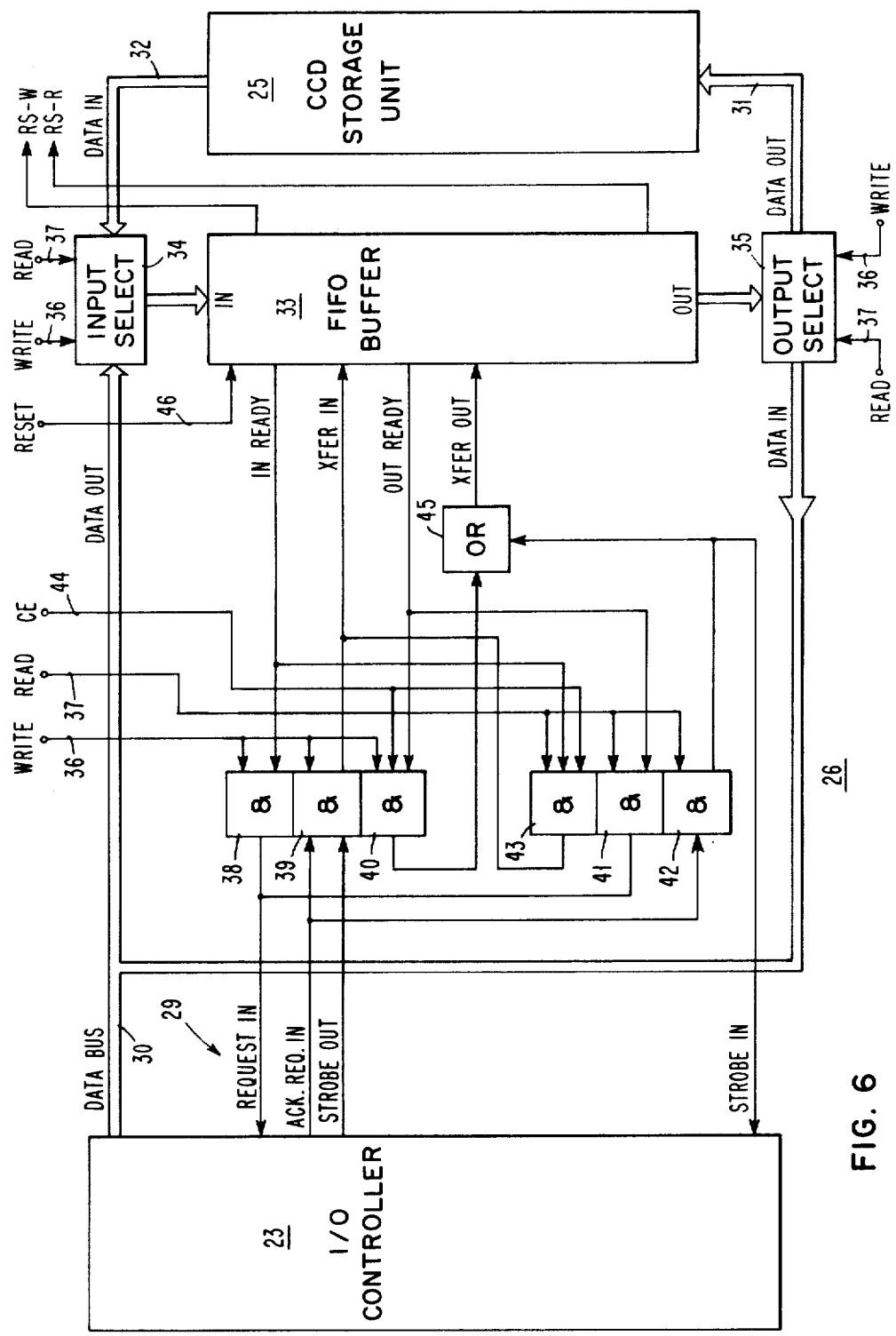
FIG. 6 shows in greater detail the construction of the FIFO buffer circuits of FIG. 5 for the case of a third embodiment of the present invention.

Referring to FIGS. 6 and 7, there will now be described in a fair amount of detail the necessary construction of the storage control unit 24 for enabling the system of FIG. 5 to practice a third embodiment of the present invention. The embodiment to be described in connection with FIGS. 6 and 7 is very similar to the embodiment shown in FIGS. 3 and 4, except that only a single register status line will be used for write operations and only a single register status line will be used for read operations. In other words, the embodiment to be described in FIGS. 6 and 7 provides only two different operating speeds for the CCD storage mechanism or storage unit 25. Nevertheless, the use of these two different operating speeds enables the use of a FIFO buffer of substantially less size than would be required were the CCD storage mechanism to be operated at only a single speed when doing read and write operations.

As will be seen, when performing write operations, the embodiment of FIGS. 6 and 7 corresponds to the embodiment of FIG. 3 for the case where only the status line 13 is used, the decoder 12 is not used and the status line 13 is connected to the high speed input of the clock generator 16. When doing a read operation, on the other hand, the embodiments of FIGS. 6 and 7 corresponds to the embodiment of FIG. 4 for the case where only the status line 17 is used, the decoder 20 is not used and the status line 17 is coupled by way of a NOT circuit to the high speed input of the clock generator 16.

Referring first to FIG. 6, there is shown in greater detail the internal construction of the FIFO buffer circuits 26 of FIG. 5. These FIFO buffer circuits 26 include a FIFO buffer storage mechanism 33 having its input register stage connected to an input selector circuit 34 and having its output stage connected to an output selector circuit 35. When doing write operations (write mode), the input selector 34 connects the I/O controller data bus 30 to the input stage of the FIFO buffer 33 and the output selector 35 connects the output stage of the FIFO buffer 33 to the bus 31 which runs to the data input terminals of the CCD storage unit 25. When doing read operations (read mode), the input selector 34 connects the bus 32 which is coming from the data output terminals of the CCD storage unit 25 to the input stage of the FIFO buffer 33 and the output selector 35 connects the output stage of the FIFO buffer 33 to the I/O controller data bus 30. Thus, any data which is transferred from the I/O controller 23 to the CCD storage unit 25 or vice versa always passes through the FIFO buffer 33.

When doing write operations, a WRITE control line 36 is at a binary one level and a READ control line 37 is at a binary zero level. Conversely, when doing read operations, the READ control line 37 is at the binary one level and the WRITE control line 36 is at the binary zero level. Among other things, these WRITE and READ control lines 36 and 37 control the activation of the switching or gating circuits inside the input and output selectors 34 and 35.

When performing write operations, AND circuits 38, 39 and 40 are enabled by the signal on the WRITE control line 36 to provide the necessary connections for the various handshake signalling lines during the write mode. Conversely, during read operations, AND circuits 41, 42 and 43 are activated by the signal on the READ control line 37 to provide the necessary connections of the various handshake signalling lines during the read mode.

Considering first the handshake signalling between the I/O controller 23 and the FIFO buffer 33 for the WRITE mode, the FIFO buffer 33 indicates that it is ready to receive another byte of data (its input stage is empty) by raising its "In Ready" line. This "In Ready" signal is transferred by way of AND circuit 38 to the "Request In" line of the I/O controller 23. In due course, the I/O controller 23 raises its "Acknowledge Request In" line and sends out a strobe pulse on its "Strobe Out" line. This Strobe Out pulse is passed by the AND circuit 39 to the "Transfer In (Xfer In)" terminal of the FIFO buffer 33. This causes the data byte appearing on the controller data bus 30 to be loaded into the input register in the FIFO buffer 33. It also causes the FIFO buffer 33 to drop the signal level on its "In Ready" line. This signalling process is thereafter repeated over and over again to transfer the various bytes of data from the I/O controller 23 to the FIFO buffer 33. The timing is completely asynchronous. A data byte is transferred whenever the input stage of the FIFO buffer 33 is empty and the controller 23 has a byte ready for transfer. The rate of transfer is determined primarily by the rate at which the data bytes are being transferred from the host processor 21 to the I/O controller 23.

Considering now the WRITE mode handshaking between the FIFO buffer 33 and the CCD storage unit 25, such handshaking is carried out by way of the AND circuit 40. When the FIFO buffer 33 is ready, that is, when it has a data byte in its output register, it raises its "Out Ready" line. This enables the next occurring chip enable (CE) pulse on line 44 coming from the timing circuits 27 to pass by way of the AND circuit 40 and OR circuit 45 to the "Transfer Out" terminal of the FIFO buffer 33. As seen from FIG. 5, the chip enable (CE) timing pulses are also supplied to the CCD storage unit 25. Each chip enable pulse causes the CCD unit 25 to perform either a Write operation or a Read operation, depending upon the status of a Read/Write select line which also runs to the CCD unit 25. No Read or Write operations can take place inside of the CCD unit 25 except during the occurrence of the CE pulse. With respect to FIG. 6, the trailing edge of the CE pulse appearing on the "Transfer Out" line of the FIFO buffer causes the FIFO buffer 33 to drop the signal level on its "Out Ready" line and also causes the various data bytes stored in the FIFO buffer 33 to be shifted down one register position so as to place a new data byte into the FIFO buffer output register. Thereafter, this signalling sequence is repeated each time another data byte is transferred from the FIFO buffer 33 to the CCD storage unit 25. The timing for these data transfers is determined primarily by the CE pulses which, as will be seen, have the same frequency as the timing pulses which control the operating speed of the CCD storage unit 25.

Considering now the Read mode handshake signalling between the I/O controller 23 and the FIFO buffer 33, the "Out Ready" signal from the FIFO buffer 33 is passed by way of AND circuit 41 to the "Request In" line of the controller 23. The resulting "Acknowledge Request In" signal from controller 23 is passed by way of AND circuit 42 and OR circuit 45 to the "Transfer Out" terminal of the FIFO buffer 33. The output of AND circuit 42 is also connected to the "Strobe In" line of the controller 23 to cause a strobing in of the data byte which is supplied to the data bus 30 by the output register of the FIFO buffer 33.

The Read mode handshake signalling between the FIFO buffer 33 and the CCD storage unit 25 is controlled by way of the AND circuit 43. When the FIFO buffer 33 is ready to receive another data byte, the "In Ready" line is activated. The next occurring CE pulse is then passed by way of AND circuit 43 to the "Transfer In" terminal of the buffer 33. This loads the data byte from the CCE storage unit 25 (via bus 32 and input selector 34) into the input register of the FIFO buffer 33.

In the FIG. 6 embodiment, the present invention makes use of two different register status lines of the FIFO buffer 33. These are the Write mode register status line RS-W and the Read mode register status line RS-R. The RS-W status line is connected to a FIFO register which, in terms of the register chain, is located fairly close to the input register in the chain. Conversely, the RS-R status line is connected to a FIFO register which is located very near the bottom or output end of the FIFO register chain or stack. The RS-W status line is used during the Write mode to indicate whether or not the FIFO buffer 33 is in a nearly full condition. Conversely, the RS-R register status line is used during the Read mode to provide an indication of whether or not the FIFO buffer 33 is in a nearly empty condition. These RS-W and RS-R status lines run to the timing circuits 27 to control the operating speed thereof.

A "Reset" line 46 is also provided for the FIFO buffer 33. Activation of this Reset line 46 causes all of the registers in the FIFO buffer 33 to be reset to an empty condition.

One further point should be noted concerning the FIFO buffer 33. Some currently marketed FIFO storage modules do not provide separate status lines for each of the different FIFO register stages. They instead provide status lines only for the input register, the middle or half-way register and the output register or, in some cases, only for the input and output registers. This limitation can be circumvented by using FIFO storage modules having relatively small storage capacity and connecting several of such modules in cascade. In this manner, the input and output status lines of the intermediate modules then become the status lines of intermediate stages in the overall stack.

Figure 7A:
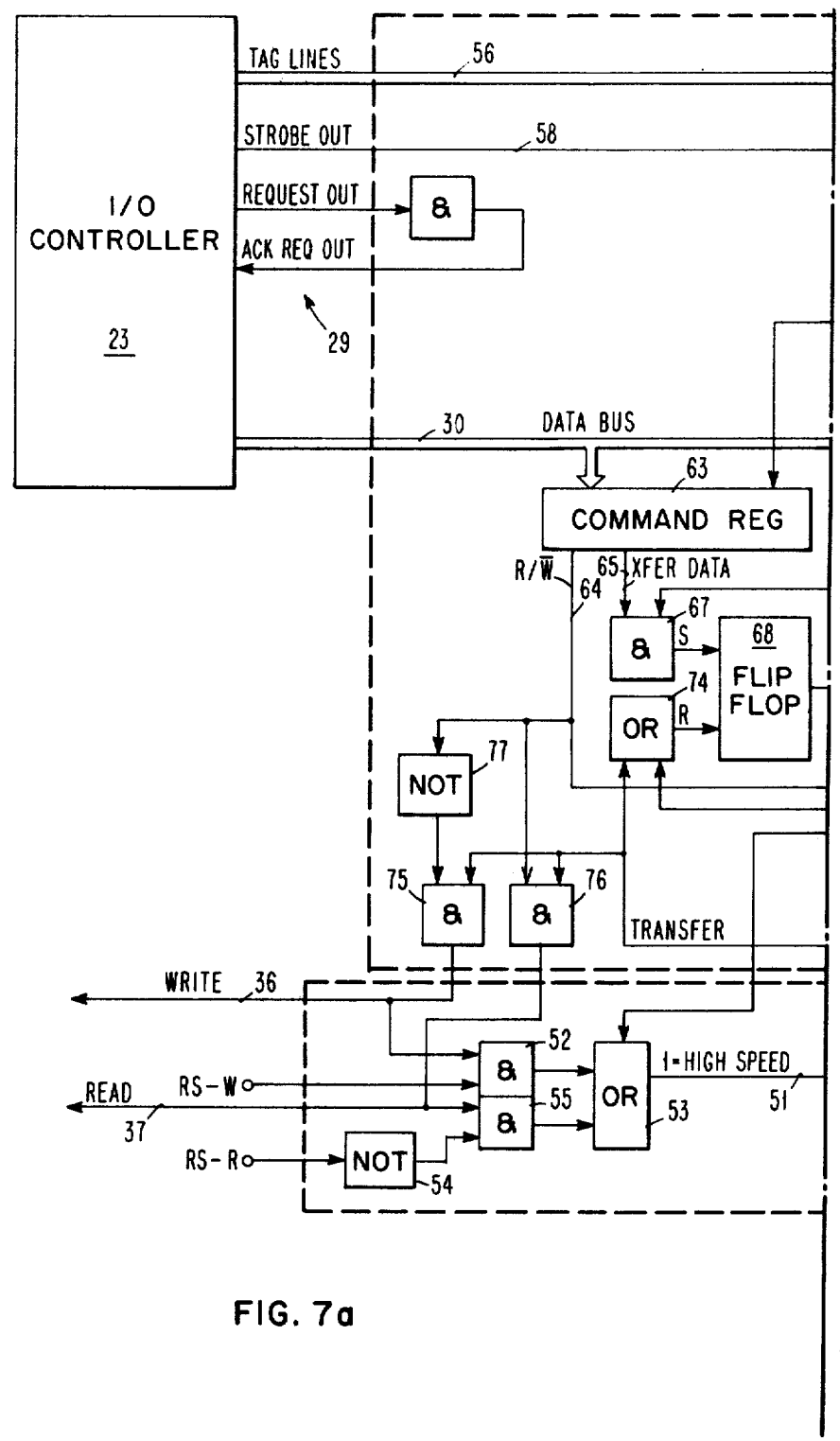
FIGS. 7a and 7b, when placed side by side, show in greater detail the construction of the command and address circuits and the timing circuits of FIG. 5 for the case of the third embodiment of this invention.
Figure 7B:
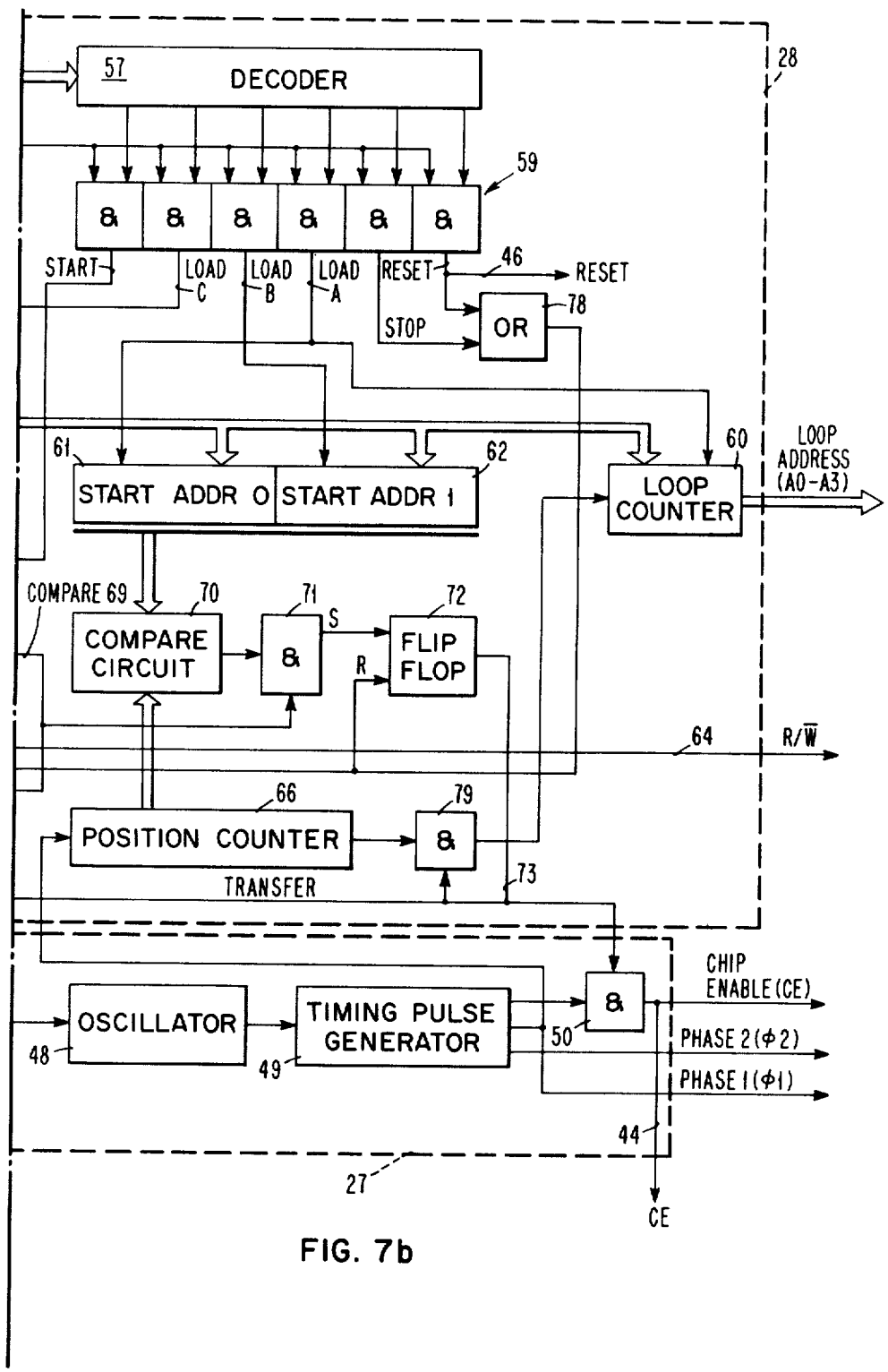

Referring now to FIGS. 7a and 7b, there will first be considered the construction and operation of the timing circuits 27. These timing circuits include an oscillator 48 and a timing pulse generator 49. For each pulse from the oscillator 48, the timing pulse generator produces a sequence of three time spaced output pulses $\phi 1$, $\phi 2$ and CE. As indicated, these are produced on different output lines and, as indicated in FIG. 5, these output lines run to the CCD storage unit 25. Each pair of $\phi 1$ and $\phi 2$ pulses causes the data in the CCD unit 25 to be shifted forward by one bit position in each of the sixteen storage loops in each of the nine CCD modules. Each CE pulse causes each of the nine CCD modules to write in or read out one bit of data. An AND circuit 50 is connected in to the CE output line to allow the chip enable pulses to be disabled when it is not desired to read or write data into or out of the CCD unit 25.

Since the oscillator 48 is generating output pulses in a continuous manner, the data in the CCD storage unit 25 is continually circulating around the various storage loops inside such CCD unit 25. The oscillator 48 is capable of supplying these output pulses at one of two different frequencies, the particular frequency being determined by the status of a speed control input line 51 to the oscillator 48. If line 51 is at the binary one level, oscillator 48 produces output pulses at a high frequency and alternatively, if line 51 is at a binary zero level, oscillator 48 produces output pulses at a low frequency. Oscillator 48 may include, for example, an oscillator circuit which continuously generates pulses at the high frequency and a voltage divider circuit that can divide the pulse frequency down to the desired low frequency. Speed control line 51 is then connected to suitable gating circuitry which selects the appropriate one of the oscillator circuit output or the frequency divider output as the final output for the oscillator 48. The construction is preferably such that the low frequency is equal to the minimum frequency required by the CCD storage unit 25 for refresh purposes.

During Write operations, the signal level on the oscillator speed control line 51 is controlled by the RS-W status line from the FIFO buffer 33. This status line is coupled by way of AND circuit 52 and OR circuit 53 to the oscillator speed control line 51, AND circuit 52 being enabled by the WRITE control signal on line 36 during such Write operations. If the FIFO buffer 33 is nearly full (RS-W FIFO register full), then the RS-W line is at the binary one level, thus setting the speed control line 51 to the one level to call for high speed operation. Conversely, if the FIFO buffer is not nearly full, then the RS-W line and hence the speed control line 51 is at the binary zero level to call for low speed operation.

During Read operations, the RS-R status line from the FIFO buffer 33 is used to control the oscillator speed control line 51. This is accomplished by way of NOT circuit 54, AND circuit 55 and OR circuit 53. If the FIFO buffer 33 is nearly empty, the resulting zero level of the RS-R line is inverted by the NOT circuit 54 to provide a one level on the speed control line 51 to call for high speed operation. Conversely, if the FIFO buffer 33 is not nearly empty, then the resulting one level on the RS-R status line is inverted by the NOT circuit 54 to produce a zero level on the speed control line 51 to call for low speed operation.

With one exception to be considered hereinafter, when neither a Read nor a Write operation is being performed, the oscillator 48 is operated at the low or minimum refresh speed. This occurs because both of AND circuits 52 and 55 are disabled, thus causing a zero level signal on the speed control line 51.

Considering now the command and address circuits 28, the storage control unit 24 needs to know several things. It needs to know what kind of operations is to be performed, like whether it is to perform a read operation or, on the other hand, a write operation. The storage control unit 24 also needs to know the address in the CCD storage unit at which the Read or Write operation is to be commenced. It also needs to know the point at which the Read or Write operation is to be stopped. This information is transferred from the I/O controller 23 to the command and address circuits 28 by the various ones of the control lines 29 which are shown in FIG. 7a as running to the command and address circuits 28.

The housekeeping control functions needed within the command and address circuits 28 are controlled by the binary code combination on tag lines 56. In other words, whenever the I/O controller 23 wants to send a signal to the command and address circuits 28, it places a particular binary code on the tag lines 56. This activates a particular one of the output lines of a decoder 57. The controller 23 then sends out a strobe pulse on its "Strobe Out" line 58 and this strobe pulse is passed by the particular one of AND circuits 59 which is activated by the decoder 57 to produce the desired control pulse within the command and address circuits 28.

As mentioned, the storage control unit needs to know the starting address for the data transfer operation. It is assumed, for sake of example herein, that a 16-bit address is needed. This address is supplied one byte (8 bits) at a time by way of the data bus 30. In order to transfer the high order address byte, the I/O controller 23 places the high order address byte on the data bus 30, the proper control code on the tag lines 56 and then issues a strobe out pulse on the line 58. This produces a control pulse on the "Load A" control line. This loads the four higher order address bits on the data bus 30 into a loop counter 60 and the four lower order address bits on the data bus 30 into a start address 0 register 61. The I/O controller 23 then sends out the low order address byte by placing it on the data bus 30, placing the proper control code on tag lines 56 and sending out a second strobe pulse on strobe out line 58. This produces a control pulse on the "Load B" control line, which control pulse loads the low order address byte into a start address 1 register 62.

In a similar manner, a command register 63 is loaded with the appropriate operating command. In other words, the I/O controller 23 puts the desired command on the data bus 30, the appropriate control code on tag lines 56 and then sends out a third strobe out pulse. This produces a control pulse on the Load C control line which, in turn, loads the command byte appearing on data bus 30 into the command register 63. Output line 64 of the command register 63 indicates whether a Read (R) or a Write (W) operation is to be performed. If line 64 is at the binary one level, a Read operation is to be performed. If line 64 is at the zero level, a Write operation is to be performed. When command register output line 65 is at the binary one level, this indicates that a data transfer operation, as opposed to some other type of operation, is to be performed.

Command and address circuits 28 include a position counter 66, the counting input of which is being continuously driven by one of the output lines of the timing pulse generator 49. The count value in the position counter 66 is the relative address of the storage positions within the CCD storage loops which are at that moment at the loop Read/Write positions in the CCD unit 25. The higher order address bits in loop counter 60, on the other hand, select the particular ones of the various storage loops which are to be looked at for Read/Write purposes.

With the loop counter 60 and the address and command registers 61, 62 and 63 properly loaded, the data transfer operation is commenced by the I/O controller 23 sending out a start code on tag lines 56 and a strobe pulse on line 58. This produces a control pulse on the "Start" control line connected to the output of the left-hand one of AND circuits 59. This start pulse is passed by AND circuit 67 to set a "Compare" flip flop 68. This starts an address comparison operation for purposes of locating the proper starting position for the data circulating around in the CCD unit 25. To accomplish this as rapidly as possible, the one level at the output of flip-flop 68 is supplied by way of line 69 and the OR circuit 53 to place the oscillator speed control line 51 at the high speed indicating binary one level for the duration of the compare operation.

The address compare operation is performed by a compare circuit 70 which compares the desired starting address in registers 61 and 62 with the continually changing loop position address in the position counter 66. When an address match occurs, compare circuit 70 produces an output pulse which is supplied by way of a now enabled AND circuit 71 to set a "Transfer" flip-flop 72. The leading edge of the output signal produced by flip-flop 72 when it is flipped to the set position is passed by way of the "Transfer" control line 73 and OR circuit 74 to reset the compare flip-flop 68. This terminates the "Compare" interval and removes the one level high speed signal on speed control line 51 and disables the compare circuit output AND gate 71.

Unless otherwise reset by the I/O controller 23, the output of the "Transfer" flip-flop 72 remains at the binary one level for the duration of the data transfer operation. This one level transfer indicating signal is supplied by way of the transfer control line 73 to AND circuits 75 and 76. The second input of AND circuit 75 receives by way of NOT circuit 77 the complement of the signal level on the Read/Write output line 64 of the command register 63. Thus, the output line of AND circuit 75 which is, in fact, the Write control line 36, is turned on for the duration of a Write data transfer operation. Conversely, the second input of the AND circuit 76 is connected directly to the Read/Write command register output line 64. Thus, the output line of AND circuit 76 which is, in fact, the Read control line 37, is turned on or placed at the binary one level for the duration of a Read mode data transfer operation. Thus, only one or the other, but not both, of the Write control line 36 and the Read control line 37 are placed at the binary one level during any given data transfer operation. These control lines 36 and 37 run to the FIFO buffer circuits 26 to perform the functions discussed above in connection with FIG. 6.

Note also that the Read/Write control line 64 of command register 63 also runs to the CCD storage unit 25 so that it also knows what type of operation is to be performed.

The output of the "Transfer" flip-flop 72 is also supplied to the AND circuit 50 connected in series with the Chip Enable output line of the timing pulse generator 49 for purposes of enabling such AND circuit 50 for allowing Chip Enable pulses to be supplied to the CCD storage unit 25 for the duration of the data transfer interval.

The command and address circuits 28 are told when to stop the data transfer operation by the I/O controller 23. The I/O controller 23 contains a byte counter which is used to recognize when the desired number of data bytes have been transferred. Hence, this byte count function need not be provided in the command and address circuits 28. Also, the I/O controller 23 stops sending out or taking in additional bytes of data whenever its internal byte counter tells it that the desired number of bytes have been transferred.

In order to turn off the data transfer operation in the command and address circuits 28, the I/O controller 23 puts the appropriate control code on tag lines 56 and sends out a strobe pulse on line 58. This produces a control pulse at the output of the AND circuit 59 having the "Stop" output line. This stop pulse is supplied by way of OR circuit 78 to the reset terminal of the "Transfer" flip-flop 72 to reset the output of such flip-flop to the binary zero level. This terminates the data transfer operation. A point to note is that, for the illustrated implementation and when doing a Write operation, the I/O controller 23 must delay the sending out of the Stop signal long enough to allow for the emptying out of the FIFO buffer 33 by the CCD storage unit 25. This is no great problem since the I/O controller 23 will no longer be accepting or acknowledging any data transfer requests from the FIFO buffer circuits once its internal byte counter tells it that the desired number of bytes have been transferred.

The overflow output of position counter 66 is, during data transfer operations, coupled by way of AND circuit 79 to the counting input of the loop counter 60. This enables the data transfer operation to progress from one CCD loop to the next should such action be required in order to supply the desired amount of data.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Serial storage interface apparatus for coupling a serial storage mechanism to an input/output (I/O) bus of a data processor and comprising:

bus utilization monitoring circuitry responsive to the data transfer activity of the data transfer circuitry for generating signals representing values of I/O bus availability;

data transfer circuitry for coupling the serial storage mechanism to the data processor I/O bus;

and speed control circuitry responsive to the signals representing values of I/O bus availability for causing the serial storage mechanism to operate at different speeds for different values of I/O bus availability to the serial storage interface apparatus.

2. Serial storage interface apparatus in accordance with claim 1 wherein the speed control circuitry causes the serial storage mechanism to operate at a higher speed when the I/O bus is available to the serial storage interface apparatus a greater percentage of the time and at a lower speed when the I/O bus is available to the serial storage interface apparatus a lesser percentage of the time.

3. Serial storage interface apparatus in accordance with claim 1 wherein the speed control circuitry causes the serial storage mechanism to operate at a higher speed when the data processor is responding more rapidly to data transfer requests from the serial storage interface apparatus and at a lower speed when the data processor is responding less rapidly to data transfer requests from the serial storage interface apparatus.

4. Serial storage interface apparatus in accordance with claim 1 wherein:
the interface apparatus further includes timing circuitry for supplying timing signals to the serial storage mechanism for controlling the operating speed thereof;
and the speed control circuitry is responsive to the data transfer activity of the data transfer circuitry for causing the timing circuitry to operate at different speeds for different values of I/O bus availability to the serial storage interface apparatus.

5. Serial storage interface apparatus for coupling a serial storage mechanism to an input/output (I/O) bus of a data processor and comprising:
a first-in-first-out (FIFO) buffer storage mechanism;
first data transfer circuitry for coupling the FIFO buffer storage mechanism to the data processor I/O bus;
second data transfer circuitry for coupling the FIFO buffer storage mechanism to the serial storage mechanism;
bus utilization monitoring circuitry responsive to the data transfer activity of the first data transfer circuitry for generating signals representing values of I/O bus availability; and speed control circuitry responsive to the signals representing values of I/O bus availability for causing the serial storage mechanism to operate at different speeds for different values of I/O bus availability to the serial storage interface apparatus.

6. Serial storage interface apparatus in accordance with claim 5 wherein the serial storage mechanism is a charge coupled device storage mechanism.

7. Serial storage interface apparatus in accordance with claim 5 wherein the speed control circuitry causes the serial storage mechanism to operate at a higher speed when the I/O bus is available to the serial storage interface apparatus a greater percentage of the time and at a lower speed when the I/O bus is available to the serial storage interface apparatus a lesser percentage of the time.

8. Serial storage interface apparatus in accordance with claim 5 wherein the speed control circuitry causes the serial storage mechanism to operate at a higher speed when the data processor is responding more rapidly to data transfer requests from the serial storage interface apparatus and at a lower speed when the data processor is responding less rapidly to data transfer requests from the serial storage interface apparatus.

9. Serial storage interface apparatus in accordance with claim 5 wherein the apparatus further includes timing circuitry for supplying timing signals to the serial storage mechanism for controlling the operating speed thereof and wherein the speed control circuitry is responsive to the data transfer activity of the first data transfer circuitry for causing the timing circuitry to operate at different speeds for different values of I/O bus availability to the serial storage interface apparatus.

10. Serial storage interface apparatus for coupling a serial storage mechanism to an input/output (I/O) bus of a data processor and comprising:
a first-in-first-out (FIFO) buffer storage mechanism;
first data transfer circuitry for coupling the FIFO buffer storage mechanism to the data processor I/O bus;
second data transfer circuitry for coupling the FIFO buffer storage mechanism to the serial storage mechanism;
FIFO utilization monitoring circuitry coupled to the FIFO buffer storage mechanism and responsive to the amount of data in the FIFO buffer storage mechanism for generating signals representing values of FIFO storage availability;
and speed control circuitry responsive to the signals representing values of FIFO storage availability for causing the serial storage mechanism to operate at different speeds for different amounts of data in the FIFO buffer storage mechanism.

11. Serial storage interface apparatus in accordance with claim 10 wherein:
the serial storage interface apparatus is operated in a write mode for transferring data from the data processor to the serial storage mechanism via the FIFO buffer storage mechanism;
the speed control circuitry causes the serial storage mechanism to operate at a higher speed than the amount of data in the FIFO buffer storage mechanism is equal to or greater than a predetermined value;
the speed control circuitry causes the serial storage mechanism to operate at a lower speed when the amount of data in the FIFO buffer storage mechanism is less than this predetermined value;
and the aforesaid predetermined value represents a nearly full condition of the FIFO buffer storage mechanism.

12. Serial storage interface apparatus in accordance with claim 10 wherein:
the serial storage interface apparatus is operated in a read mode for transferring data from the serial storage mechanism to the data processor via the FIFO buffer storage mechanism;
the speed control circuitry causes the serial storage mechanism to operate at a higher speed when the amount of data in the FIFO buffer storage mechanism is less than a predetermined value;
the speed control circuitry causes the serial storage mechanism to operate at a lower speed when the amount of data in the FIFO buffer storage mechanism is equal to or greater than this predetermined value;
and the aforesaid predetermined value represents a nearly empty condition of the FIFO buffer storage mechanism.

13. Serial storage interface apparatus in accordance with claim 10 wherein the FIFO buffer storage mechanism includes:
multiple registers coupled in cascade and each capable of storing a unit of data;
and circuitry for automatically moving data units successively stored into the input one of the FIFO registers from one register to the next so as to keep the data units in and as close to the output one of the FIFO registers as is possible, the data units being advanced one register position toward the output register each time a data unit is removed from such output register.

14. Serial storage interface apparatus in accordance with claim 13 wherein:

the FIFO buffer storage mechanism includes a status line which provides signals indicative of the full-/empty status of one of the FIFO registers;

and the speed control circuitry is responsive to the signals on this FIFO status line for causing the serial storage mechanism to operate at one speed when the status line signal indicates a full status and at another and different speed when the status line signal indicates an empty status.

15. Serial storage interface apparatus in accordance with claim 14 wherein:

the serial storage interface apparatus is operated in a write mode for transferring data from the data processor to the serial storage mechanism via the FIFO buffer storage mechanism;

the status line is coupled to a FIFO register closer to the input one of such FIFO registers;

and the speed control circuitry is responsive to the signals on this status line for causing the serial storage mechanism to operate at a higher speed when the status line signal indicates a full stagus and at a lower speed when the status line signal indicates an empty status.

16. Serial storage interface apparatus in accordance with claim 14 wherein:

the serial storage interface apparatus is operated in a read mode for transferring data from the serial storage mechanism to the data processor via the FIFO buffer storage mechanism;

the status line is coupled to a FIFO register closer to the output one of such registers;

and the speed control circuitry is responsive to the signals on this status line for causing the serial storage mechanism to operate at a higher speed when the status line signal indicates an empty status and at a lower speed when the status line signal indicates a full status.

* * * * *

REEXAMINATION CERTIFICATE (186th)
United States Patent [19]
Dixon et al.

[11] B1 4,344,132
[45] Certificate Issued Mar. 27, 1984

[54] SERIAL STORAGE INTERFACE APPARATUS FOR COUPLING A SERIAL STORAGE MECHANISM TO A DATA PROCESSOR INPUT/OUTPUT BUS

[75] Inventors: Jerry D. Dixon, Boca Raton; Robert H. Farrell, Coral Springs; Francis R. Koperda, Delray Beach, all of Fla.

[73] Assignee: International Business Machines Corporation, Armonk, N.Y.

Reexamination Request:
No. 90/000,332, Feb. 18, 1983

Reexamination Certificate for:
Patent No.: 4,344,132
Issued: Aug. 10, 1982
Appl. No.: 103,782
Filed: Dec. 14, 1979

[51] Int. Cl.³ .................... G06F 3/00; G06F 5/06
[52] U.S. Cl. .................... 364/200; 307/271; 307/DIG. 1
[58] Field of Search ... 364/200 MS File, 900 MS File; 307/271, DIG. 1

[56] References Cited
U.S. PATENT DOCUMENTS

| | | | |
|---|---|---|---|
| 3,370,276 | 2/1968 | Schell, Jr. | 364/200 |
| 3,406,378 | 10/1968 | Bradford | 364/900 |
| 3,569,943 | 3/1971 | Mackie et al. | 364/200 |
| 3,696,338 | 10/1972 | Preiss | 364/200 |
| 3,836,891 | 9/1974 | McDaniel | 364/900 |
| 3,840,859 | 10/1974 | Vigil et al. | 364/200 |
| 3,980,993 | 9/1976 | Bredart et al. | 364/200 |
| 4,040,027 | 8/1977 | Van Es et al. | 364/900 |
| 4,143,418 | 3/1979 | Hodge et al. | 364/200 |
| 4,220,997 | 9/1980 | Hager | 364/900 |
| 4,228,860 | 9/1981 | Trost | 364/900 |

OTHER PUBLICATIONS

IBM Tech. Discl. Bull., vol. 20, No. 4, Sep. 1977, written by Handloff, pp. 1562–1564.

*Primary Examiner*—Eddie P. Chan

[57] ABSTRACT

Serial storage interface apparatus for coupling a serial storage mechanism, such as a charge coupled storage device or a magnetic bubble storage device, to a data processor input/output (I/O) bus. Speed control circuitry is provided for causing the serial storage mechanism to operate at a higher speed when the data processor is responding more rapidly to data transfer requests from the interface apparatus and at a lower speed when the data processor is responding less rapidly to data transfer requests from the interface apparatus. This speed adjustment feature reduces the amount of data buffering required for interfacing a serial storage mechanism to an asynchronous variable response time I/O bus system.

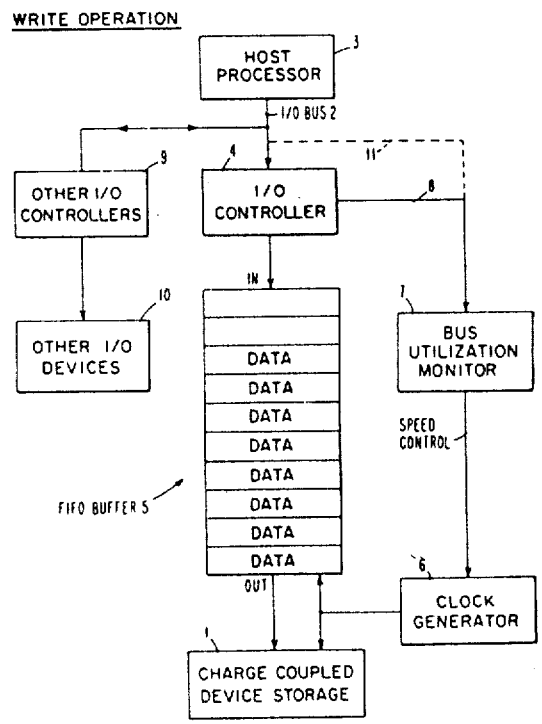

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, and 10 are determined to be patentable as amended:

Claims 2-4, 6-9, and 11-16, dependent on amended claims, are determined to be patentable.

1. Serial storage interface apparatus for coupling a serial storage mechanism to an input/output (I/O) bus of a data processor and comprising:
    address circuitry receiving address information from the input/output bus for performing an address comparison operation for locating the proper starting address storage location in the serial storage mechanism;
    data transfer circuitry for coupling the serial storage mechanism to the data processor I/O bus for transferring data between the addressed storage locations and the I/O bus;
    bus utilization monitoring circuitry responsive to the data transfer activity of the data transfer circuitry for generating signals representing values of I/O bus availability;
    [data transfer circuitry for coupling the serial storage mechanism to the data processor I/O bus;]
    and speed control circuitry responsive to the signals representing values of I/O bus availability for causing the serial storage mechanism to operate at different speeds for different values of I/O bus availability [to the serial storage interface apparatus] *during data transfer operations and responsive to a compare signal from the address circuitry for causing the serial storage mechanism to operate at a high speed and maintain the high speed for the entire comparison operation for locating the proper starting address in the serial storage.*

5. Serial storage interface apparatus for coupling a serial storage mechanism to an input/output (I/O) bus of a data processor and comprising:
    address circuitry receiving address information from the input/output bus for performing an address compari-*son operation for locating the proper starting address storage location in the serial storage mechanism;*
    a first-in-first-out (FIFO) buffer storage mechanism;
    first data transfer circuitry for coupling the FIFO buffer storage mechanism to the data processor I/O bus;
    second data transfer circuitry for coupling the FIFO buffer storage mechanism to the serial storage mechanism;
    bus utilization monitoring circuitry responsive to the data transfer activity of the first data transfer circuitry for generating signals representing values of I/O bus availability;
    and speed control circuitry responsive to the signals representing values of I/O bus availability for causing the serial storage mechanism to operate at different speeds for different values of I/O bus availability [to the serial storage interface apparatus] *during data transfer operations and responsive to a compare signal from the address circuitry for causing the serial storage mechanism to operate at a high speed and maintain the high speed for the entire comparison operation for locating the proper starting address in the serial storage.*

10. Serial storage interface apparatus for coupling a serial storage mechanism to an input/output (I/O) bus of a data processor and comprising:
    address circuitry receiving address information from the input/output bus for performing an address comparison operation for locating the proper starting address storage location in the serial storage mechanism;
    a first-in-first-out (FIFO) buffer storage mechanism;
    first data transfer circuitry for coupling the FIFO buffer storage mechanism to the data processor I/O bus;
    second data transfer circuitry for coupling the FIFO buffer storage mechanism to the serial storage mechanism;
    FIFO utilization monitoring circuitry coupled to the FIFO buffer storage mechanism and responsive to the amount of data in the FIFO buffer storage mechanism for generating signals representing values of FIFO storage availability;
    and speed control circuitry responsive to the signals representing values of FIFO storage availability for causing the serial storage mechanism to operate at different speeds for different amounts of data in the FIFO buffer storage mechanism *during data transfer operations and responsive to a compare signal from the address circuitry for causing the serial storage mechanism to operate at a high speed and maintain the high speed for the entire comparison operation for locating the proper starting address in the serial storage.*

* * * * *